United States Patent
Wong et al.

(10) Patent No.: US 7,118,776 B2
(45) Date of Patent: *Oct. 10, 2006

(54) PHYTASE-TREATED ACID STABLE SOY PROTEIN PRODUCTS

(75) Inventors: Theodore M. Wong, Manchester, MO (US); Shaowen Wu, St. Louis, MO (US); Cheng Shen, Kirkwood, MO (US)

(73) Assignee: Solae, LLC, St. Louis, MO (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/797,442

(22) Filed: Mar. 10, 2004

(65) Prior Publication Data

US 2005/0202147 A1   Sep. 15, 2005

(51) Int. Cl.
*A23J 1/00* (2006.01)
*A23J 1/12* (2006.01)
*A23J 1/14* (2006.01)

(52) U.S. Cl. .............. 426/656; 426/590; 426/598

(58) Field of Classification Search ......... 426/656, 426/590, 598
See application file for complete search history.

(56) References Cited

U.S. PATENT DOCUMENTS

| | | | | |
|---|---|---|---|---|
| 2,732,395 A | 1/1956 | Bolley et al. | ...... | 558/147 |
| 3,736,147 A | 5/1973 | Iacobucci et al. | ...... | 530/377 |
| 4,039,696 A * | 8/1977 | Marquardt et al. | ...... | 426/598 |
| 4,072,670 A | 2/1978 | Goodnight et al. | ...... | 260/123.5 |
| 4,697,004 A | 9/1987 | Puski et al. | ...... | 530/378 |
| 5,248,765 A | 9/1993 | Mazer et al. | ...... | 530/372 |
| 5,286,511 A * | 2/1994 | Klavons et al. | ...... | 426/577 |
| 5,658,609 A * | 8/1997 | Abboud et al. | ...... | 426/609 |
| 5,858,449 A * | 1/1999 | Crank et al. | ...... | 426/656 |
| 6,139,892 A * | 10/2000 | Fredlund et al. | ...... | 426/458 |
| 6,221,419 B1 * | 4/2001 | Gerrish | ...... | 426/577 |
| 6,303,160 B1 * | 10/2001 | Laye et al. | ...... | 426/36 |
| 6,811,804 B1 * | 11/2004 | Patel et al. | ...... | 426/598 |
| 6,861,080 B1 * | 3/2005 | Kent et al. | ...... | 426/36 |
| 6,887,508 B1 * | 5/2005 | Huang | ...... | 426/573 |
| 2004/0258827 A1 * | 12/2004 | Shen | ...... | 426/598 |

FOREIGN PATENT DOCUMENTS

| | | | |
|---|---|---|---|
| EP | 380343 | * | 8/1990 |
| EP | 1338210 | * | 8/2003 |
| EP | 1 364 585 A1 | | 11/2003 |

* cited by examiner

*Primary Examiner*—Anthony Weier
(74) *Attorney, Agent, or Firm*—James L. Cordek; Holly M. Amjad; Cary A. Levitt (57) ABSTRACT

This invention is directed to an acidic beverage composition, comprising;
(A) a hydrated protein material having a combination of an inositol-6-phosphate content, an inositol-5-phosphate content, an inositol-4-phosphate content and an inositol-3-phosphate content of less than 8.0 μmol/g, with
(B) a hydrated protein stabilizing agent and
(C) at least one acid comprising a fruit juice, a vegetable juice, citric acid, malic acid, tartaric acid, lactic acid, ascorbic acid, glucono delta lactone or phosphoric acid, wherein the acidic beverage composition has a pH of from 3.0 to 4.5.

45 Claims, 1 Drawing Sheet

Fig. 1

PHYTASE-TREATED ACID STABLE SOY PROTEIN PRODUCTS

FIELD OF THE INVENTION

This invention relates to a protein based acidic beverage composition that is smooth, tasteful, palatable and has good storage stability in an acidic environment. Stability is enhanced by an acid soluble protein and by the addition of stabilizers such as starch, pectin and hydrocolloids. The protein employed has a low phytic acid content of inositol-6-phosphate, inositol-5-phosphate, inositol-4-phosphate and inositol-3-phosphate. Reducing the phytic acid content of a vegetable protein causes the solubility-pH curve to shift to the right.

BACKGROUND OF THE INVENTION

Phytic acid is represented by the below Formula I.

Formula I

Phytic acid or phytate is the hexa-phosphorus ester of inositol (1,2,3,4,5,6-cyclohexanehexolphosphoric acid), found in many seeds and cereals. It acts as the primary storage form of both phosphorus and inositol and accounts for as much as 50% of the total phosphorus content. Phytic acid in plants appears in the form of calcium, magnesium and potassium salts, which in general are called phytin. A large part of the phosphorus content of seeds is stored in these compounds. For example, about 70% of the total phosphorus in soybeans is accounted for by phytin. When the terms phytate or phytic acid are used herein, it is intended to include salts of phytic acid and molecular complexes of phytic acid with other soybean constituents.

All legumes contain phytic acid. However, soybeans have higher levels of phytic acid than any other legume. Phytic acid tends to form complexes with proteins and multivalent metal cations. Phytic acid complexes decrease the nutritional quality of soy protein. Phytic acid, because it interacts with multivalent metal cations, interferes with the assimilation by animals and humans of various metals such as calcium, iron and zinc. This may lead to deficiency disorders, especially for vegetarians, elderly people and infants.

Phytic acid also inhibits various enzymes in the gastrointestinal tract, including pepsin and trypsin and decreases the digestibility of soy protein. In addition, the phosphate present in phytic acid is not available to humans. Moreover, the presence of a relatively large amount of such unavailable phosphorus in infant food many lead to inadequate bone mineralization.

In typical commercial soy protein isolation processes, defatted soy flakes or soy flour are slurried with water and a base and extracted at pH values between 8.0 and 10.0 to solubilize proteins. The slurry is centrifuged to separate the insoluble part from the solution. The major fraction is recovered from the solution by precipitating at a pH near the isoelectric point of the protein (4.5), separating it by centrifugation, washing the precipitate with water redispersing it at pH 7 and spray-drying it to a powder. In such processes, phytic acid will follow the protein and tends to concentrate in the resulting soy protein product. The phytic acid content of commercial soy protein isolates is about 1.2–3%, whereas soybeans contain 1–2% phytic acid.

U.S. Pat. No. 2,732,395 (Bolley, et al., Jan. 24, 1956) discloses a method for separation of phytin from various oil seeds. The method involves acid extraction of an oil free seed meal or flour with aqueous acid at a pH within approximately the isoelectric range of the particular seed protein, generally about pH 4.5. The phytin is recovered from the soluble portion and the protein is recovered from the curd by extraction at a pH greater than 8 with separation of insoluble materials, and subsequent coagulation of the protein in the clarified alkaline extract by acidification, again within the isoelectric range of the protein. The method is applied to various oil seeds including defatted soybean flour to provide purified protein which is allegedly substantially free from organic phosphorous compounds.

U.S. Pat. No. 3,736,147 (Iacobucci et al., May 29, 1973) discloses an ultrafiltration process for the preparation of soy protein isolate having a reduced phytic acid content which involves various chemical treatments in combination with extensive ultrafiltration. Chemical treatment involves either enzymatic hydrolysis of the phytic acid by the enzyme phytase at neutral pH prior to ultrafiltration, ultrafiltration in the presence of calcium ion at low pH, or the use of ethylenediaminetetraacetic acid at a high pH.

U.S. Pat. No. 4,072,670 (Goodnight, Jr., et al., Feb. 7, 1978) discloses a basic flaw in prior art processes for the preparation of acid precipitated soy protein isolate as exemplified in the Bolley, et al., and Robbins, et al. patents cited above. The prior art precipitated the soy protein in the flake with acid in the presence of phytic acid. Goodnight, et al., found that an alkali stable complex is formed between the protein and the phytic acid under these circumstances which prevents dissociation of the phytin from the soybean protein at alkaline pH as is disclosed in the McKinney, et al. article cited above.

U.S. Pat. No. 4,697,004 (Puski et al., Sep. 29, 1987) relates to a high quality soy protein isolate with significantly reduced aluminum content and substantially free of phytic acid and phytate complexes that is prepared by aqueous extraction of defatted particulated soybeans at pH 8 to 10, and at a temperature above 65° C., separating the extract and then precipitating the protein out of solution, at a pH slightly higher than its isoelectric point, i.e., pH 5.3.

U.S. Pat. No. 5,248,765 (Mazer et al., Sep. 28, 1993) relates to a method for separating phytate and manganese from protein and dietary fiber that involves treatment of an aqueous slurry of phytate-containing material at a low pH with insoluble alumina.

European Patent 1,364,585 A1 (Fuji Oil Company, Ltd.) relates to producing a soybean protein which can be widely utilized in an acidic food of pH lower than 4.6 and is soluble in a range of pH 3.0 to 4.5, and whose solution has preferred transparency in appearance and excellent storage stability together with functional properties such as emulsifying and gel-forming capabilities. The reference shows that an original cloudy protein solution can be converted into a solubilized state having transparency by subjecting to the following treatments. The treatments subject a solution containing a soybean protein to either or both of (A) a treatment for eliminating or inactivating polyanionic substances which are derived from the protein source and contained in the solution, and (B) a treatment for adding a polycationic substance to the solution, as a treatment for increasing the positive surface charge of soybean protein in the system; and then subjecting the protein solution to a heat treatment at a temperature of above 100° C. in an acidic region of pH below the isoelectric point of the protein.

SUMMARY OF THE INVENTION

This invention is directed to an acidic beverage composition, comprising;
(A) a hydrated protein material having a combination of an inositol-6-phosphate content, an inositol-5-phosphate content, an inositol-4-phosphate content, and an inositol-3-phosphate content of less than 8.0 μmol/g, with
(B) a hydrated protein stabilizing agent and
(C) at least one acid comprising a fruit juice, a vegetable juice, citric acid, malic acid, tartaric acid, lactic acid, ascorbic acid, glucono delta lactone or phosphoric acid, wherein the acidic beverage composition has a pH of from 3.0 to 4.5.

The protein material, prior to hydration, can be prepared by one of three different processes. The first process for the preparation of a protein material having a combination of an inositol-6-phosphate content, an inositol-5-phosphate content, an inositol-4-phosphate content, and an inositol-3-phosphate content of less than 8.0 μmol/g, comprises:
(1) preparing an aqueous extract from a protein containing plant material,
(2) adjusting the pH of the extract to a value of from about 4 to about 5 to precipitate the protein material,
(3) separating the precipitated protein material and forming a suspension of the precipitated protein material in water,
(4) adjusting the pH of the suspension to a value of from about 3.5 to about 6 to form a partially solubilized protein material in water,
(5) adding a phytase to the partially solubilized protein material in water to form a phytase treated protein material, and
(6) drying the protein material.

The second process for the preparation of a protein material having a combination of an inositol-6-phosphate content, an inositol-5-phosphate content, an inositol-4-phosphate content, and an inositol-3-phosphate content of less than 8.0 μmol/g, comprises:
(1) preparing an aqueous extract from a protein containing plant material,
(2) adding a phytase to the aqueous extract to form a phytase extract,
(3) adjusting the pH of the phytase extract to a value of from about 4 to about 5.5 to precipitate the protein material,
(4) separating the precipitated protein material and forming a suspension of the precipitated protein material in water,
(5) adjusting the pH of the suspension to a value of from about 6.7 to about 7.4 to form a solubilized protein material in water, and
(6) drying the protein material.

The third process for the preparation of a protein material having a combination of an inositol-6-phosphate content, an inositol-5-phosphate content, an inositol-4-phosphate content, and an inositol-3-phosphate content of less than 8.0 μmol/g, comprises:
(1) preparing an aqueous extract from a protein containing plant material,
(2) adjusting the pH of the extract to a value of from about 4 to about 5 to precipitate the protein material,
(3) separating the precipitated protein material and forming a suspension of the precipitated protein material in water,
(4) adjusting the pH of the suspension to a value of from about 6.7 to about 7.4 to form a solubilized protein material in water,
(5) adding a phytase to the solubilized protein material in water to form a phytase treated solubilized protein material, and
(6) drying the protein material.

DETAILED DESCRIPTION OF THE INVENTION

The Protein Material (A)

The protein containing plant material of the present invention may be any vegetable or animal protein that is at least partially insoluble in an aqueous acidic liquid, preferably in an aqueous acidic liquid having a pH of from 3.0 to 5.5, and most preferably in an aqueous acidic liquid having a pH of from 3.5 to 4.5. As used herein a "partially insoluble" protein material is a protein material that contains at least 10% insoluble material, by weight of the protein material, at a specified pH. Preferred protein materials useful in the composition of the present invention include soy protein materials, corn protein materials—particularly zein, and wheat gluten.

Soybean protein materials which are useful with the present invention are soy flour, soy concentrate, and, most preferably, soy protein isolate. The soy flour, soy concentrate, and soy protein isolate are formed from a soybean starting material which may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes.

Soy flour, as that term is used herein, refers to a comminuted form of defatted soybean material, preferably containing less than 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a protein content of from about 49% up to about 65% on a moisture free basis (mfb). Preferably the flour is very finely ground, most preferably so that less than about 1% of the flour is retained on a 300 mesh (U.S. Standard) screen.

Soy concentrate, as the term is used herein, refers to a soy protein material containing from about 65% up to about 90% of soy protein (mfb). Soy concentrate is preferably formed from a commercially available defatted soy flake material from which the oil has been removed by solvent extraction.

The soy concentrate is produced by an acid leaching process or by an alcohol leaching process. In the acid leaching process, the soy flake material is washed with an aqueous solvent having a pH at about the isoelectric point of soy protein, preferably at a pH of about 4 to about 5, and most preferably at a pH of about 4.4 to about 4.6. The isoelectric wash removes a large amount of water soluble carbohydrates and other water soluble components from the flakes, but removes little of the protein and fiber, thereby forming a soy concentrate. The soy concentrate is dried after the isoelectric wash. In the alcohol leaching process, the soy flake material is washed with an aqueous ethyl alcohol solution wherein ethyl alcohol is present at about 60% by weight. The protein and fiber remain insoluble while the carbohydrate soy sugars of sucrose, stachyose and raffinose are leached from the defatted flakes. The soy soluble sugars in the aqueous alcohol are separated from the insoluble protein and fiber and the insoluble protein and fiber are dried to form the soy concentrate.

Soy protein isolate, as the term is used herein, refers to a soy protein material containing at least about 90% protein content, and preferably from about 95% or greater protein content (mfb). Soy protein isolate is typically produced from a starting material, such as defatted soybean material, in which the oil is extracted to leave soybean meal or flakes. More specifically, the soybeans may be initially crushed or ground and then passed through a conventional oil expeller. It is preferable, however, to remove the oil contained in the soybeans by solvent extraction with aliphatic hydrocarbons, such as hexane or azeotropes thereof, and these represent conventional techniques employed for the removal of oil. The defatted soy protein material or soybean flakes are then placed in an aqueous bath to provide a mixture having a pH of at least about 6.5 and preferably between about 7.0 and 10.0 in order to extract the protein. Typically, if it is desired to elevate the pH above 6.7, various alkaline reagents such as sodium hydroxide, potassium hydroxide and calcium hydroxide or other commonly accepted food grade alkaline reagents may be employed to elevate the pH. A pH of above about 7.0 is generally preferred, since an alkaline extraction facilitates solubilization of the protein. Typically, the pH of the aqueous extract of protein will be at least about 6.5 and preferably about 7.0 to 10.0. The ratio by weight of the aqueous extractant to the vegetable protein material is usually between about 20 to 1 and preferably a ratio of about 10 to 1. In an alternative embodiment, the vegetable protein is extracted from the milled, defatted flakes with water, that is, without a pH adjustment.

It is also desirable in obtaining the soy protein isolate that an elevated temperature be employed during the aqueous extraction step, either with or without a pH adjustment, to facilitate solubilization of the protein, although ambient temperatures are equally satisfactory if desired. The extraction temperatures which may be employed can range from ambient up to about 120° F. with a preferred temperature of 90° F. The period of extraction is further non-limiting and a period of time between about 5 to 120 minutes may be conveniently employed with a preferred time of about 30 minutes. Following extraction of the vegetable protein material, the aqueous extract of protein can be stored in a holding tank or suitable container while a second extraction is performed on the insoluble solids from the first aqueous extraction step. This improves the efficiency and yield of the extraction process by exhaustively extracting the protein from the residual solids from the first step.

The combined, aqueous protein extracts from both extraction steps, without the pH adjustment or having a pH of at least 6.5, or preferably about 7.0 to 10, are then precipitated by adjustment of the pH of the extracts to, at or near the isoelectric point of the protein to form an insoluble curd precipitate. The actual pH to which the protein extracts are adjusted will vary depending upon the vegetable protein material employed but insofar as soy protein, this typically is between about 4.0 and 5.0. The precipitation step may be conveniently carried out by the addition of a common food grade acidic reagent such as acetic acid, sulfuric acid, phosphoric acid, hydrochloric acid or with any other suitable acidic reagent. The soy protein precipitates from the acidified extract, and is then separated from the extract. The separated protein may be washed with water to remove residual soluble carbohydrates and ash from the protein material and then solubilized by the addition of a basic reagent such as sodium hydroxide or potassium hydroxide. The solubilized protein is then dried using conventional drying means to form a soy protein isolate. Depending upon the process used for obtaining a protein material having a combination of an inositol-6-phosphate content, an inositol-5-phosphate content, an inositol-4-phosphate content, and an inositol-3-phosphate content of less than 8.0 μmol/g; phytase or acid phosphatases are added at different steps in that particular process to reduce the phytic acid content.

Preferably the protein material used in the present invention, is modified to enhance the characteristics of the protein material. The modifications are modifications which are known in the art to improve the utility or characteristics of a protein material and include, but are not limited to, denaturation and hydrolysis of the protein material.

The protein material may be denatured and hydrolyzed to lower the viscosity. Chemical denaturation and hydrolysis of protein materials is well known in the art and typically consists of treating a protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a protein material are: a pH of up to about 10, preferably up to about 9.7; a temperature of about 50° C. to about 80° C. and a time period of about 15 minutes to about 3 hours, where the denaturation and hydrolysis of the protein material occurs more rapidly at higher pH and temperature conditions.

Hydrolysis of the protein material may also be effected by treating the protein material with an enzyme capable of hydrolyzing the protein. Many enzymes are known in the art which hydrolyze protein materials, including, but not limited to, fungal proteases, microbial proteases, plant proteases, animal protease, and chymotrypsin. Enzyme hydrolysis is effected by adding a sufficient amount of enzyme to an aqueous dispersion of protein material, typically from about 0.1% to about 10% enzyme by weight of the protein material, and treating the enzyme and protein dispersion at a temperature, typically from about 5° C. to about 75° C., and a pH, typically from about 3 to about 9, at which the enzyme is active for a period of time sufficient to hydrolyze the protein material. After sufficient hydrolysis has occurred the enzyme is deactivated by heating to a temperature above 75° C., and the protein material is precipitated from the solution by adjusting the pH of the solution to about the isoelectric point of the protein material.

A particularly preferred modified soy protein material is a soy protein isolate that has been enzymatically hydrolyzed and deamidated under conditions that expose the core of the proteins to enzymatic action as described in European Patent No. 0 480 104 B1, which is incorporated herein by reference. Briefly, the modified protein isolate material disclosed in European Patent No. 0 480 104 B1 is formed by: 1) forming an aqueous slurry of a soy protein isolate; 2) adjusting the pH of the slurry to a pH of from 9.0 to 11.0; 3) adding between 0.01 and 5% of a proteolytic enzyme to the slurry (by weight of the dry protein in the slurry); 4) treating the alkaline slurry at a temperature of 10° C. to 75° C. for a time period effective to produce a modified protein material having a molecular weight distribution (Mn) between 800 and 4000 and a deamidation level of between 5% to 48% (typically between 10 minutes to 4 hours); and deactivating the proteolytic enzyme by heating the slurry above 75° C. The modified protein material disclosed in European Patent No. 0 480 104 B1 is commercially available from Protein Technologies International, Inc of St. Louis, Mo.

For a typical protein isolate, the inositol-6-phosphate content is from about 15 up to about 30 μmol/g, the inositol-5-phosphate content is from about 1 up to about 2 μmol/g, and the inositol-4-phosphate content and the inositol-3-phosphate content are both non-detectable. In the course of treating a protein to reduce the inositol-6-phosphate content, sequentially the inositol-5-phosphate content, the inositol-4-phosphate content and inositol-3-phosphate content are increased. That is, in reducing the inositol-6-phosphate content from 22 μmol/g to 3.5 μmol/g, the inositol-5-phosphate content may increase to not more than 1.5 μmol/g, the inositol-4-phosphate content increases from non-detectable to not more than 1.1 μmol/g and the inositol-3-phosphate content increases from non-detectable to not more than 1.8 μmol/g.

For this acid beverage composition, it is important that the protein material has a combination of an inositol-6-phosphate content, an inositol-5-phosphate content, an inositol-4-phosphate content, and an inositol-3-phosphate content of less than 8.0 μmol/g, preferably less than 6.0 μmol/g and most preferably less than 3.0 μmol/g.

To remove the combination of the inositol-6-phosphate content, the inositol-5-phosphate content, the inositol-4-phosphate content, and the inositol-3-phosphate content to less than 8.0 μmol/g from a protein, it is necessary to employ phytate-degrading enzymes. The phytate-degrading enzymes react with the inositol-6-phosphate and the inositol-5-phosphate to generate inositol and orthophosphate as well as several forms of inositolphosphates as intermediate products. Phytate-degrading enzymes include phytase and acid phosphatases. Particularly preferred enzymes are sold under the trademark Finase® S by Alko Ltd., Helsinki, Finland; Amano 3000 from Amano Pharmaceutical Co., LTD, Nagoya, Japan and Natuphos® Phytase from BASF Corp., Wyandotte, Mich.

Phytase and acid phosphatases are produced by various microorganisms such as *Aspergillus* spp., *Rhizopus* spp., and yeasts (Appl. Microbiol. 16:1348–1357 (1968; Enzyme Microb. Technol. 5:377–382 (1983)), and phytase is also produced by various plant seeds, for example wheat, during germination. According to methods known in the art, enzyme preparations can be obtained from the above mentioned organisms. Caransa et al, Netherlands Pat. Appl. 87.02735, found that at the same enzyme dosage phytase from *Aspergillus* spp. degraded phytic acid in corn more efficiently than phytase from wheat.

Particularly preferred for the purposes of the present invention are the Finase enzymes, formerly termed Econase EP 43 Enzymes, manufactured by Alko Ltd., Rajamaki, Finland. These are described in U.S. application Ser. No. 242,243, filed Sep. 12, 1988.

Microbially produced enzyme preparations may also contain enzymes that degrade additional plant material such as enzymes with cellulose, hemicellulose, and/or pectinase activity. These other activities may contribute to the effects of a finished acid beverage.

The protein material that has a combination of an inositol-6-phosphate content, an inositol-5-phosphate content, an inositol-4-phosphate content, and an inositol-3-phosphate content of less than 8.0 μmol/g, prior to hydration, is prepared by one of three different processes.

The first process for the preparation of a protein material having a combination of an inositol-6-phosphate content, an inositol-5-phosphate content, an inositol-4-phosphate content and an inositol-3-phosphate content of less than 8.0 μmol/g, comprises:
 (1) preparing an aqueous extract from a protein containing plant material,
 (2) adjusting the pH of the extract to a value of from about 4 to about 5 to precipitate the protein material,
 (3) separating the precipitated protein material and forming a suspension of the precipitated protein material in water,
 (4) adjusting the pH of the suspension to a value of from about 3.5 to about 6 to form a partially solubilized protein material in water,
 (5) adding a phytase to the partially solubilized protein material in water to form a phytase treated protein material, and
 (6) drying the protein material.

The second process for the preparation of a protein material having a combination of an inositol-6-phosphate content, an inositol-5-phosphate content, an inositol-4-phosphate content, and an inositol-3-phosphate content of less than 8.0 μmol/g, comprises:
 (1) preparing an aqueous extract from a protein containing plant material,
 (2) adding a phytase to the aqueous extract to form a phytase extract,
 (3) adjusting the pH of the phytase extract to a value of from about 4 to about 5.5 to precipitate the protein material,
 (4) separating the precipitated protein material and forming a suspension of the precipitated protein material in water,
 (5) adjusting the pH of the suspension to a value of from about 6.7 to about 7.4 to form a solubilized protein material in water, and
 (6) drying the protein material.

The third process for the preparation of a protein material having a combination of an inositol-6-phosphate content, an inositol-5-phosphate content, an inositol-4-phosphate content, and an inositol-3-phosphate content of less than 8.0 μmol/g, comprises:
 (1) preparing an aqueous extract from a protein containing plant material,
 (2) adjusting the pH of the extract to a value of from about 4 to about 5 to precipitate the protein material,
 (3) separating the precipitated protein material and forming a suspension of the precipitated protein material in water,
 (4) adjusting the pH of the suspension to a value of from about 6.7 to about 7.4 to form a solubilized protein material in water,
 (5) adding a phytase to the solubilized protein material in water to form a phytase treated solubilized protein material, and
 (6) drying the protein material.

The amount of phytate degrading enzyme required will depend upon the phytic acid content of the raw material and the reaction conditions. The right dosage can easily be estimated by a person skilled in the art. Generally the concentration of the phytate degrading enzyme is from about 500 to about 2200, preferably from about 600 to about 2100 and most preferably from about 720 to about 1400 units of phytase (phytase unit) per gram of protein, which is usually expressed as PU/g. One Phytase Unit (PU) is defined as the amount of enzyme which under standard conditions (i.e. at pH 5.5, 37° C., a substrate concentration of 5.0 mM sodium phytate, and a reaction time of 30 minutes) liberates 1 µmol of phosphate per minute.

Alternatively, the concentration of the phytate degrading enzyme can be expressed as a percent curd solid basis (CSB). A 0.25% CSB means that if 1000 parts curd are present as solids, then the amount of phytase employed is 2.5 parts. Preferably, the enzyme preparation comprises such an amount of one or more phytate-degrading enzymes that the phytic acid in soy beans is substantially degraded. The phytate degrading enzyme may provide an easy and commercially attractive method for preparing low-phytate and phytate-free soy protein isolates without exposing the proteins to high alkalinity which decreases their nutritive value and at which a very light, suspended phytate precipitate, which cannot be separated with commercial continuous separators, is formed. The phytate degrading enzyme may also provide a phytate-free soy protein isolate without exposing the proteins to temperatures about 65° C., which may affect the solubility and other functional properties of the protein. Also unnecessary contact of soy protein with living microorganisms and expensive and time-consuming purification steps, such as ultrafiltration and ion-exchange treatments may not be required.

Figure 1:
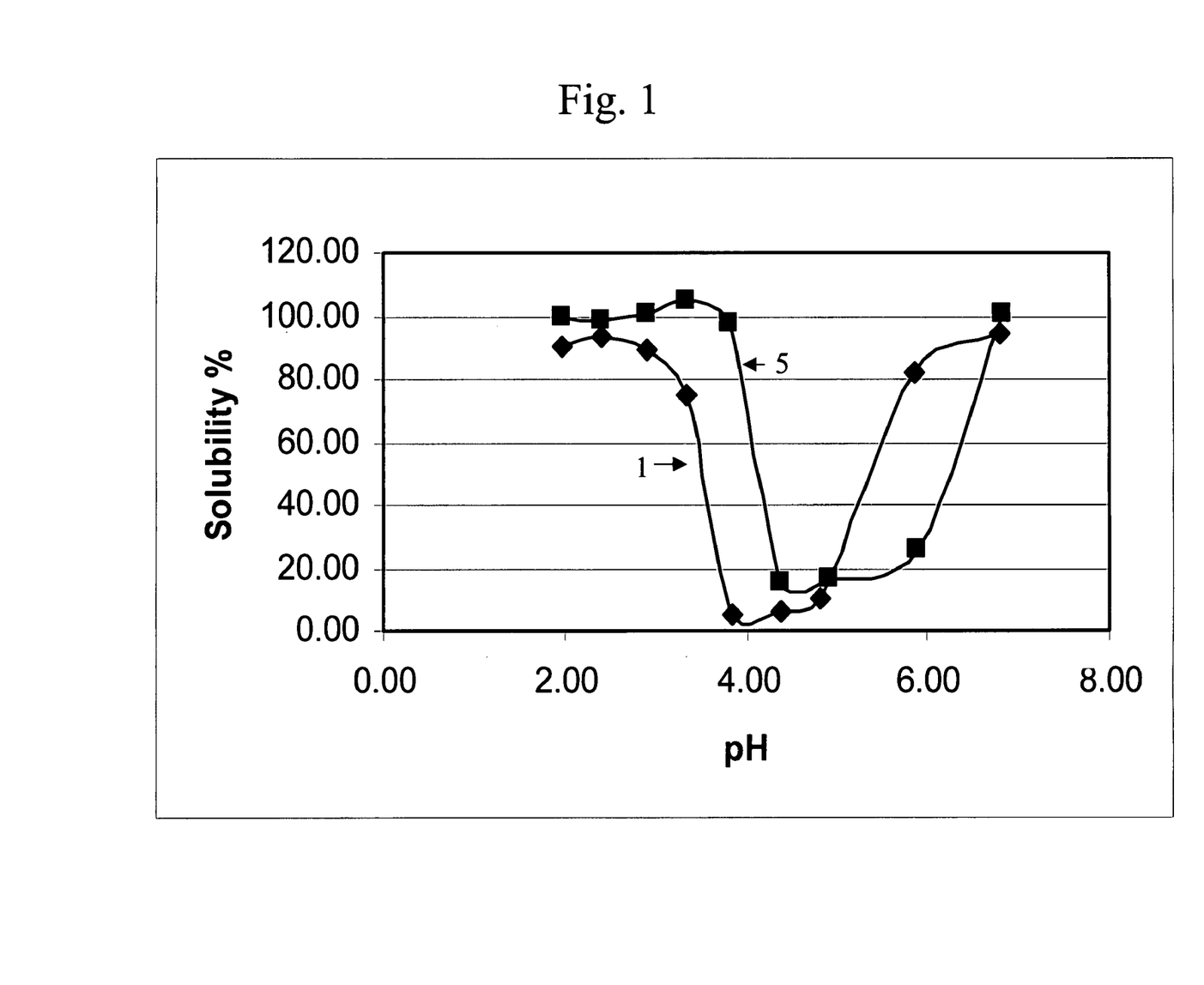
FIG. 1 is a graph showing the effect of pH versus the solubility of a normal soy protein isolate that contains phytic acid a soy protein isolate with a reduced phytic acid content.

Removal of phytic acid from the protein material causes the pH curve to shift to the right. The importance of a pH shift to the right is detailed in FIG. 1. For a protein material with the normal amount of phytic acid, identified as 1 in FIG. 1, the protein is least soluble at a pH of 3.9–4.2. At this pH, the solubility of the protein is 5%. However, this is the pH of the finished acid beverage. Consequently the protein settles out of the acid beverage as a sediment. For a protein material having a combination of an inositol-6-phosphate content, an inositol-5-phosphate content, an inositol-4-phosphate content, and an inositol-3-phosphate content of less than 8.0 µmol/g, identified as 5 in FIG. 1, the pH curve shifts to the right and protein is least soluble at a pH of 4.4–4.8. However, on this curve, at pH of 3.9, the protein is very soluble (100%) and thus in a finished acid beverage at a pH of 3.9, the protein material will be soluble and not settle out as a sediment.

The following examples are directed to the preparation of protein isolates for use in acid beverages. Example 1 relates to the preparation of baseline protein isolate that has not been treated to reduce phytic acid. Examples A–C relate to the preparation of protein isolates containing a low phytic acid content as defined by the present invention. Examples A and A1 relate to the first process for the preparation of a protein material having a combination of an inositol-6-phosphate content, an inositol-5-phosphate content, an inositol-4-phosphate content, and an inositol-3-phosphate content of less than 8.0 µmol/g. Example B relates to the second process for the preparation of a protein material having a combination of an inositol-6-phosphate content, an inositol-5-phosphate content, an inositol-4-phosphate content, and an inositol-3-phosphate content of less than 8.0 µmol/g. Example C relates to the third process for the preparation of a protein material having a combination of an inositol-6-phosphate content, an inositol-5-phosphate content, an inositol-4-phosphate content, and an inositol-3-phosphate content of less than 8.0 µmol/g.

EXAMPLE 1

To an extraction tank is added 100 pounds of defatted soybean flakes and 1000 pounds water. The contents are heated to 90° F. and sufficient calcium hydroxide is added to adjust the pH to 9.7. This provides a weight ratio of water to flakes of 10:1. The flakes are separated from the extract and reextracted with 600 lbs. of water having a pH of 9.7 and a temperature of 90° F. This second extraction step provides a weight ratio of water to flakes of 6:1. The flakes are removed by centrifugation, and the first and second extracts are combined and adjusted to a pH of 4.5 with phosphoric acid, which forms a precipitated protein curd and a soluble aqueous whey. The acid precipitated water insoluble curd is separated from the aqueous whey by centrifuging and washing in a CH-14 centrifuge at a speed of 4,000 rpm and a Sharples P3400 centrifuge at a speed of 3,000 rpm. Protein curds are resuspended in water at a 10–12% solid concentration and the pH is adjusted to 3.5 with additional phosphoric acid. The protein is pasteurized at 305° F. for 9 sec and spray dried with an exhaust temperature less than 200° F. to provide a protein isolate. This protein isolate has a total phytic acid content of 2.00%. This protein isolate has an inositol-6-phosphate content of 11.6 µmol/g, an inositol-5-phosphate content of 2.0 µmol/g, an inositol-4-phosphate content of less than 0.5 µmol/g and an inositol-3-phosphate content of less than 0.5 µmol/g. The combination of inositol-6-phosphate content, inositol-5-phosphate content, inositol-4-phosphate content, and inositol-3-phosphate content is 23.4 µmol/g.

EXAMPLE A

To an extraction tank is added 100 pounds of defatted soybean flakes and 1000 pounds water. The contents are heated to 90° F. and sufficient calcium hydroxide is added to adjust the pH to 9.7. This provides a weight ratio of water to flakes of 10:1. The flakes are separated from the extract and reextracted with 600 lbs. of water having a pH of 9.7 and a temperature of 90° F. This second extraction step provides a weight ratio of water to flakes of 6:1. The flakes are removed by centrifugation, and the first and second extracts are combined and adjusted to a pH of 4.5 with either hydrochloric acid or phosphoric acid, which forms a precipitated protein curd and a soluble aqueous whey. The acid precipitated water insoluble curd is separated from the aqueous whey by centrifuging and washing in a CH-14 centrifuge at a speed of 4,000 rpm and a Sharples P3400 centrifuge at a speed of 3,000 rpm. Protein curds are re-suspended in water at a 10–12% solid concentration and the pH is adjusted to 5.2 with sodium hydroxide to partially solubilize the protein. A Finase® S phytase is added to the partially solubilized protein at 720 PU/g and the contents are held at 110° F. for 1 hr with the stirring. The partially solubilized protein solution is then pasteurized at 305° F. for 9 sec and spray dried with an exhaust temperature less than 200° F. to provide a protein isolate with a reduced phytic acid content. The combination of inositol-6-phosphate content, inositol-5-phosphate content, inositol-4-phosphate content and inositol-3-phosphate content is 5.8 µmol/g.

EXAMPLE A1

The procedure of Example A is repeated except that Finase® S phytase is replaced with Natuphos® Phytase. The combination of inositol-6-phosphate content, inositol-5-phosphate content, inositol-4-phosphate content and inositol-3-phosphate content is 2.64 μmol/g.

EXAMPLE B

To an extraction tank is added 100 pounds of defatted soybean flakes and 1000 pounds water. The contents are heated to 90° F. and sufficient calcium hydroxide is added to adjust the pH to 9.7. This provides a weight ratio of water to flakes of 10:1. The flakes are separated from the extract and reextracted with 600 lbs. of water having a pH of 9.7 and a temperature of 90° F. This second extraction step provides a weight ratio of water to flakes of 6:1. The flakes are removed by centrifugation, and the first and second extracts are combined. A Finase® S phytase is added to the extract at 720 PU/g protein and the temperature is held at 110° F. for 1 hour. Phosphoric acid is added to adjust the pH to 5.1. The addition of acid forms a precipitated protein curd and a soluble aqueous whey. The acid precipitated water insoluble curd is separated from the aqueous whey by centrifuging and washing in a CH-14 centrifuge at a speed of 4,000 rpm and a Sharples P3400 centrifuge at a speed of 3,000 rpm. Protein curds are re-suspended in water at a 10–12% solid concentration, adjusted to a pH of 7.0 with sodium hydroxide to solubilize the protein and then pasteurized at 305° F. for 9 sec and spray dried with an exhaust temperature less than 200° F. to provide a protein isolate with a reduced phytic acid content. The combination of inositol-6-phosphate content, inositol-5-phosphate content, inositol-4-phosphate content and inositol-3-phosphate content is 0.18 μmol/g.

EXAMPLE C

To an extraction tank is added 100 pounds of defatted soybean flakes and 1000 pounds water. The contents are heated to 90° F. and sufficient calcium hydroxide is added to adjust the pH to 9.7. This provides a weight ratio of water to flakes of 10:1. The flakes are separated from the extract and reextracted with 600 lbs. of water having a pH of 9.7 and a temperature of 90° F. This second extraction step provides a weight ratio of water to flakes of 6:1. The flakes are removed by centrifugation, and the first and second extracts are combined and adjusted to a pH of 5.1 with phosphoric acid, which forms a precipitated protein curd and a soluble aqueous whey. The acid precipitated water insoluble curd is separated from the aqueous whey by centrifuging and washing in a CH-14 centrifuge at a speed of 4,000 rpm and a Sharples P3400 centrifuge at a speed of 3,000 rpm. Protein curds are resuspended in water at a 10–12% solid concentration and the pH is adjusted to 6.7 to 7.4 with sodium hydroxide which causes the curds to be a soluble protein solution. A phytase is added to the protein solution at 0.25% CSB and the contents are held at 110° F. for 1 hr with the stirring. The protein solution is then pasteurized at 305° F. for 9 sec and spray dried with an exhaust temperature less than 200° F. to provide a protein isolate with a reduced phytic acid content.

It is necessary to hydrate the protein material (A), prior to preparing the acid beverage. Water is added in sufficient quantity to form a slurry in order to hydrate the protein material. The dry protein material, prepared by any of the above examples, is essentially insoluble in water. It is critical to hydrate the protein material. The slurry contains from 1–10% by weight solids based on the weight of the slurry, with the remainder being water. More preferably, the slurry (A) contains from 1–7% by weight solids. Most preferably the slurry (A) contains from 2–6% by weight solids. The slurry is mixed at room temperature under high shear and heated to 140–180° F. for an additional 10 minutes. At this solids concentration, the most complete hydration is obtained in the protein. Thus, the water in the slurry is used most efficiently at this concentration.

Once the protein material is hydrated, it then is homogenized. Homogenization serves to decrease the particle size of the protein in the protein slurry (A). Preferably the slurry is transferred to a Gaulin homogenizer (model 15MR) and is homogenized in two stages, a high pressure stage and a low pressure stage. The high pressure stage is from 1500–5000 pounds per square inch and preferably from 2000–3000 pounds per square inch. The low pressure stage is from 300–1000 pounds per square inch and preferably from 400–700 pounds per square inch.

The Stabilizing Agent (B)

The present invention also employs a stabilizing agent and the stabilizing agent is a polysaccharide hydrolysate comprising dextrin, agar, carrageenan, tamarind seed polysaccharides, angelica gum, karaya gum, xanthan gum, sodium alginate, tragacanth gum, guar gum, locust bean gum, pullulan, jellan gum, gum arabic, and propylene glycol alginate ester. A preferred stabilizing agent is jellan gum.

In order to prepare a hydrated protein stabilizing agent (B), water and stabilizing agent are added in sufficient quantity to form a dispersion. A sweetener may be added this point or later or a portion of the sweetener added here and also added later. Preferred sweeteners comprise sucrose, corn syrup, and may include dextrose and high fructose corn syrup and artificial sweeteners. The stabilizing agent is hydrated in the same manner as the protein, above. The term "dispersion" means a colloidal suspension.

The Flavoring Material (C)

A protein material by itself can have an undesired aftertaste or undesired flavors. The function of the flavoring material (C) is to mask any adverse flavors of the protein material (A) and to give a pleasant taste to the acid beverage composition. The flavoring material (C) comprises a fruit juice, a vegetable juice, fruit flavor or vegetable flavor.

As a juice, the fruit and/or vegetable may be added in whole, as a liquid, a liquid concentrate, a puree or in another modified form. The liquid from the fruit and/or vegetable may be filtered prior to being used in the juice product. The fruit juice can include juice from tomatoes, berries, citrus fruit, melons and/or tropical fruits. A single fruit juice or fruit juice blends may be used. The vegetable juice can include a number of different vegetable juices. Examples of a few of the many specific juices which may be utilized in the present invention include juice from berries of all types, currants, apricots, peaches, nectarines, plums, cherries, apples, pears, oranges, grapefruits, lemons, limes, tangerines, mandarin, tangelo, bananas, pineapples, grapes, tomatoes, rhubarbs, prunes, figs, pomegranates, passion fruit, guava, kiwi, kumquat, mango, avocados, all types of melon, papaya, turnips, rutabagas, carrots, cabbage, cucumbers, squash, celery, radishes, bean sprouts, alfalfa sprouts, bamboo shoots, beans and/or seaweed. As can be appreciated, one or more fruits, one or more vegetables, and/or one or more fruits and vegetables, can be included in the acid beverage to obtain the desired flavor of the acid beverage.

Fruit and vegetable flavors can also function as the flavoring material (C). Fruit flavoring has been found to neutralize the aftertaste of protein materials. The fruit flavoring may be a natural and/or artificial flavoring. As can be appreciated, the fruit flavoring is best when used with other flavoring materials such as vegetable flavoring to mask and/or neutralize the undesired aftertaste and/or undesired flavors from the protein material.

The protein material (A) is present in the acid beverage composition in an amount of from 0.1 percent to 10 percent by weight. The stabilizing agent (B) is present in a weight ratio of (A):(B) of from 1:0.01–0.2. The flavoring material content can be at least 1.5% of the acid beverage composition.

An acid beverage composition is prepared using the above components (A), (B) and (C) according to the below generic example.

The protein material (A) is hydrated in deionized water under high shear for 5 minutes, heated to 170° F. and held for 10 minutes. Concurrently, the stabilizing agent (B) is hydrated in a separate vessel. Added to the hydrated stabilizing agent vessel are high fructose corn syrup, ascorbic acid, citric acid, phosphoric acid, a vitamin premix and the flavoring material (C). The hydrated protein slurry is then added to the hydrated stabilizing agent vessel and mixed for 10 minutes. At this point, the pH is 3.8–4.0. The contents are homogenized in two stages, a high pressure stage of 2500 pounds per square inch and a low pressure stage of 500 pounds per square inch. The homogenized contents are pasteurized at 195° F. for 60 seconds. Bottles are hot filled with the beverage at 185° F. The bottles are inverted, held for 2 minutes and then placed in ice water to bring the temperature of the contents to about room temperature. The bottles are stored and serum values and sediment values are determined at one month and at six months.

Acid beverage compositions are prepared according to the above generic example. The control sample utilizes the protein isolate of Example 1, which contains a normal amount of phytic acid. The inventive sample is identical to the control sample, except that the control sample uses the low phytic acid protein of Example A. All other components are the same and are employed in the same amounts. Both samples contain 3.0 grams protein per 8 ounce serving. The results are summarized in the below table I.

The comparative acid beverage composition using the protein of Example 1 is compared to the inventive acid beverage composition using the protein of Example A in a side-by-side acid beverage test. The serum and sediment are determined at one month and six months of samples that have been refrigerated at 4° C. The side-by-side comparison is made by filling 250 milliliter narrow mouth square bottles (Nalge Nunc International) with each beverage. The percentage of sediment and percentage of serum of each sample is then measured to determine the effectiveness of stabilization in each beverage (Sediment=solid material that has fallen out of solution/suspension; Serum=clear layer of solution containing little or no suspended protein). The percentage of sediment is determined by measuring the height of the sediment layer in the sample and measuring the height of the entire sample, where Percent Sediment=(Ht. Sediment layer)/(Ht. Total Sample)×100. The percentage of serum is determined by measuring the height of the serum layer in the sample and measuring the height of the entire sample, where Percent Serum=(Ht. Serum Layer)/(Ht. Total Sample)×100. Visual observations are also made with respect to the homogeneity, or lack thereof, of the samples.

The results of the tests are shown in Table 1 below.

TABLE I

Acid Beverage Evaluations

| | pH | Viscosity cps[1] | % Sediment | | % Serum | |
| --- | --- | --- | --- | --- | --- | --- |
| | | | one month | six months | one month | six months |
| Example 1 | 3.85 | 3.8 | 4.42 | 0 | 0 | 27.4 |
| Example A | 3.85 | 2.0 | 0 | 0 | 0 | 0 |

[1]Brookfield Model DV-II viscometer equipped with spindle S18. The reported values are in centipoise (Cps). For Example 1, at six months, there is a zero % sediment. However, that is due to the formation of 27.4% serum. The bottom portion of the vessel is not able to be read due to the serum formation on the top. Thus the six month reading of sediment for Example 1, when considered separately from the six month reading on serum, provides a false positive.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. An acidic beverage composition, comprising;
    (A) a hydrated protein material having a combination of an inositol-6-phosphate content, an inositol-5-phosphate content, an inositol-4-phosphate content and an inositol-3-phosphate content of less than 8.0 μmol/g protein material prior to hydration, wherein the protein material, prior to hydration, is prepared by a process comprising:
        preparing an aqueous extract from a protein containing plant material,
        adjusting the pH of the extract to a value of from about 4 to about 5 to precipitate the protein material,
        separating the precipitated protein material and forming a suspension of the precipitated protein material in water,
        adjusting the pH of the suspension to a value of from about 3.5 to about 6 to form a partially solubilized protein material in water,
        adding a phytase to the partially solubilized protein material in water to form a phytase treated protein material,
        pasteurizing the phytase treated protein material at a temperature of 305° F.; and
        drying the protein material; and
    (B) a hydrated protein stabilizing agent comprising a polysaccharide hydrolysate and
    (C) at least one flavoring material comprising a fruit juice, a vegetable juice, citric acid, malic acid, tartaric acid, lactic acid, ascorbic acid, glucono delta lactone or phosphoric acid,
    wherein the acidic beverage composition has a pH of from 3.0 to 4.5.

2. The composition of claim 1 wherein the hydrated protein material comprises a soybean protein material, wheat gluten or zein.

3. The composition of claim 2 wherein the hydrated soybean protein material comprises soy flour, soy concentrate or soy protein isolate.

4. The composition of claim 2 wherein the hydrated soybean protein matenal comprises soy protein isolate.

5. The composition of claim 1 where phytase is present at from about 500 to about 2200 units of phytase per gram of protein.

6. The composition of claim 1 where phytase is present at from about 600 to about 2100 units of phytase per gram of protein.

7. The composition of claim 1 where phytase is present at from about 720 to about 1400 units of phytase per gram of protein.

8. The composition of claim 1 wherein the composition contains the hydrated protein material in an amount of from 0.1 percent to 10 percent by weight.

9. The composition of claim 1 wherein the stabilizing agent (B) is present in a weight ratio of (A):(B) of from 1:0.01–0.2.

10. The composition of claim 1 where the combination of inositol-6-phosphate, inositol-5-phosphate, inositol-4-phosphate and inositol-3-phosphate is less than 6.0 µmol/g.

11. The composition of claim 1 where the combination of inositol-6-phosphate, inositol-5-phosphate, inositol-4-phosphate and inositol-3-phosphate is less than 3.0 µmol/g.

12. The composition of claim 1 wherein the polysaccharide hydrolysate comprises dextrin, agar, carrageenan, tamarind seed polysaccharides, angelica gum, karaya gum, xanthan gum, sodium alginate, tragacanth gum, guar gum, locust bean gum, pullulan, jellan gum, gum arabic, and propylene glycol alginate ester.

13. The composition of claim 1 wherein the protein stabilizing agent is jellan gum.

14. The composition of claim 1 wherein the pH of the acid beverage composition is from 3.2–4.0.

15. The composition of claim 1 wherein the pH of the acid beverage composition is from 3.6–3.8.

16. An acidic beverage composition, comprising;
(A) a hydrated protein material having a combination of an inositol-6-phosphate content, an inositol-5-phosphate content, an inositol-4-phosphate content and an inositol-3-phosphate content of less than 8.0 µmol/g protein material prior to hydration, wherein the protein material, prior to hydration, is prepared by a process comprising:
preparing an aqueous extract from a protein containing plant material,
adding a phytase to the aqueous extract to form a phytase extract,
adjusting the pH of the phytase extract to a value of from about 4 to about 5.5 to precipitate the protein material,
separating the precipitated protein material and forming a suspension of the precipitated protein material in water,
adjusting the pH of the suspension to a value of from about 6.7 to about 7.4 to form a solubilized protein material in water,
pasteurizing the phytase treated protein material at a temperature of 305° F.; and
drying the protein material; and
(B) a hydrated protein stabilizing agent comprising a polysaccharide hydrolysate and
(C) at least one acid comprising a fruit juice, a vegetable juice, citric acid, malic acid, tartaric acid, lactic acid, ascorbic acid, glucono delta lactone or phosphoric acid,
wherein the acidic beverage composition has a pH of from 3.0 to 4.5.

17. The composition of claim 16 wherein the hydrated protein material comprises a soybean protein material, wheat gluten or zein.

18. The composition of claim 17 wherein the hydrated soybean protein material comprises soy flour, soy concentrate or soy protein isolate.

19. The composition of claim 17 wherein the hydrated soybean protein material comprises soy protein isolate.

20. The composition of claim 16 where phytase is present at from about 500 to about 2200 units of phytase per gram of protein.

21. The composition of claim 16 where phytase is present at from about 600 to about 2100 units of phytase per gram of protein.

22. The composition of claim 16 where phytase is present at from about 720 to about 1400 units of phytase per gram of protein.

23. The composition of claim 16 wherein the composition contains the hydrated protein material in an amount of from 0.1 percent to 10 percent by weight.

24. The composition of claim 16 wherein the stabilizing agent (B) is present in a weight ratio of (A):(B) of from 1:0.01–0.2.

25. The composition of claim 16 where the combination of inositol-6-phosphate, inositol-5-phosphate inositol-4-phosphate and inositol-3-phosphate is less than 6.0 µmol/g.

26. The composition of claim 16 where the combination of inositol-6-phosphate, inositol-5-phosphate inositol-4-phosphate and inositol-3-phosphate is less than 3.0 µmol/g.

27. The composition of claim 16 wherein the polysaccharide hydrolysate comprises dextrin, agar, carrageenan, tamarind seed polysaccharides, angelica gum, karaya gum, xanthan gum, sodium alginate, tragacanth gum, guar gum, locust bean gum, pullulan, jellan gum, gum arabic, and propylene glycol alginate ester.

28. The composition of claim 16 wherein the protein stabilizing agent is jellan gum.

29. The composition of claim 16 wherein the pH of the acid beverage composition is from 3.2–4.0.

30. The composition of claim 16 wherein the pH of the acid beverage composition is from 3.6–3.8.

31. An acidic beverage composition, comprising;
(A) a hydrated protein material having a combination of an inositol-6-phosphate content, an inositol-5-phosphate content, an inositol-4-phosphate content and an inositol-3-phosphate content of less than 8.0 µmol/g protein material prior to hydration, wherein the protein material, prior to hydration, is prepared by a process comprising:
preparing an aqueous extract from a protein containing plant material,
adjusting the pH of the extract to a value of from about 4 to about 5 to precipitate the protein material,
separating the precipitated protein material and forming a suspension of the precipitated protein material in water,
adjusting the pH of the suspension to a value of from about 6.7 to about 7.4 to form a solubilized protein material in water,
adding a phytase to the solubilized protein material in water to form a phytase treated solubilized protein material,
pasteurizing the phytase treated protein material at 305° F.; and
drying the protein material; and
(B) a hydrated protein stabilizing agent comprising a polysaccharide hydrolysate and
(C) at least one acid comprising a fruit juice, a vegetable juice, citric acid, malic acid, tartaric acid, lactic acid, ascorbic acid, glucono delta lactone or phosphoric acid, wherein the acidic beverage composition has a pH of from 3.0 to 4.5.

32. The composition of claim 31 wherein the hydrated protein material comprises a soybean protein material, wheat gluten or zein.

33. The composition of claim 32 wherein the hydrated soybean protein material comprises soy flour, soy concentrate or soy protein isolate.

34. The composition of claim 32 wherein the hydrated soybean protein material comprises soy protein isolate.

35. The composition of claim 31 where phytase is present at from about 500 to about 2200 units of phytase per gram of protein.

36. The composition of claim 31 where phytase is present at from about 600 to about 2100 units of phytase per gram of protein.

37. The composition of claim 31 where phytase is present at from about 720 to about 1400 units of phytase per gram of protein.

38. The composition of claim 31 wherein the composition contains the hydrated protein material in an amount of from 0.1 percent to 10 percent by weight.

39. The composition of claim 31 wherein the stabilizing agent (B) is present in a weight ratio of (A):(B) of from 1:0.01–0.2.

40. The composition of claim 31 where the combination of inositol-6-phosphate, inositol-5-phosphate, inositol-4-phosphate and inositol-3-phosphate is less than 6.0 μmol/g.

41. The composition of claim 31 where the combination of inositol-6-phosphate, inositol-5-phosphate, inositol-4-phosphate and inositol-3-phosphate is less than 3.0 μmol/g.

42. The composition of claim 31 wherein the polysaccharide hydrolysate comprises dextrin, agar, carrageenan, tamarind seed polysaceharides, angelica gum, karaya gum, xanthan gum, sodium alginate, tragacanth gum, guar gum, locust bean gum, pullulan, jellan gum, gum arabic, and propylene glycol alginate ester.

43. The composition of claim 31 wherein the protein stabilizing agent is jellan gum.

44. The composition of claim 31 wherein the pH of the acid beverage composition is from 3.2–4.0.

45. The composition of claim 31 wherein the pH of the acid beverage composition is from 3.6–3.8.

* * * * *